J. B. ZIMMERMAN.
CORN HUSKING MACHINE.
APPLICATION FILED JUNE 12, 1915.
1,195,164.
Patented Aug. 15, 1916.
2 SHEETS—SHEET 1.
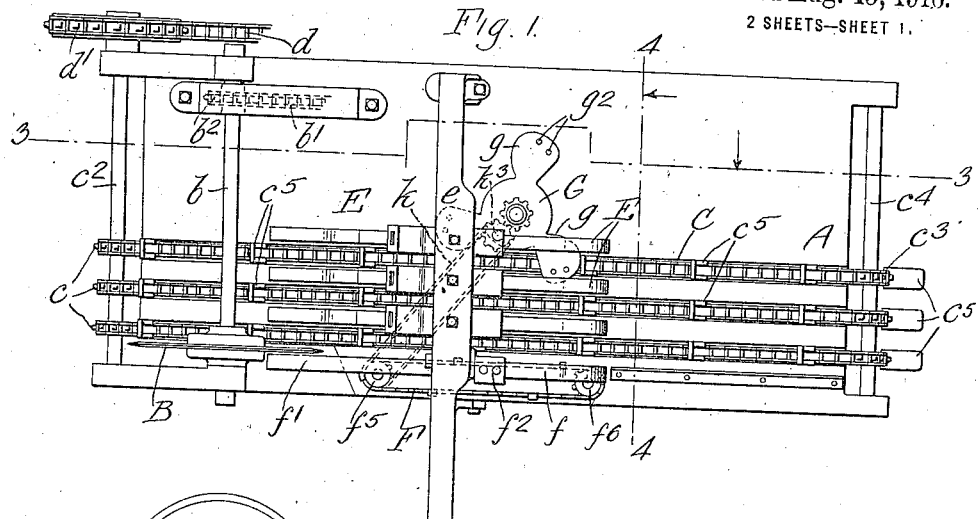
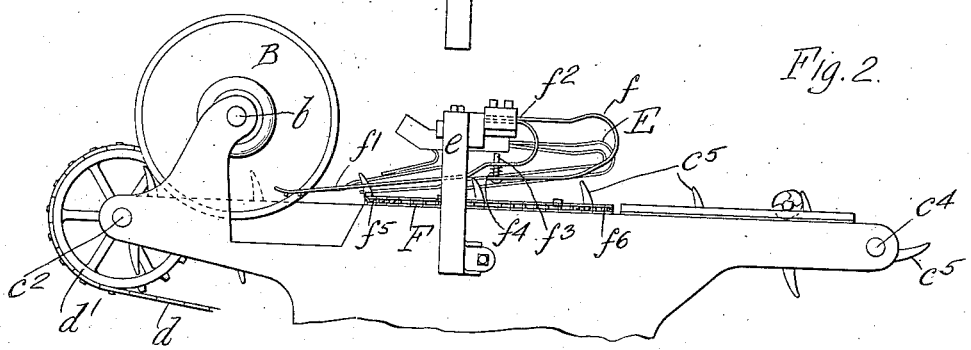
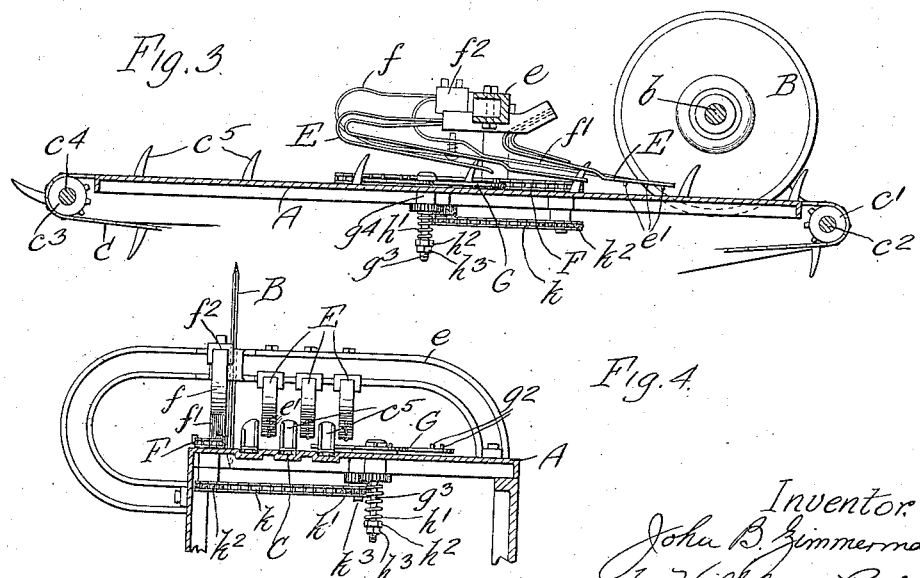
Inventor
John B. Zimmerman
by Wilhelm & Parker
Attorneys

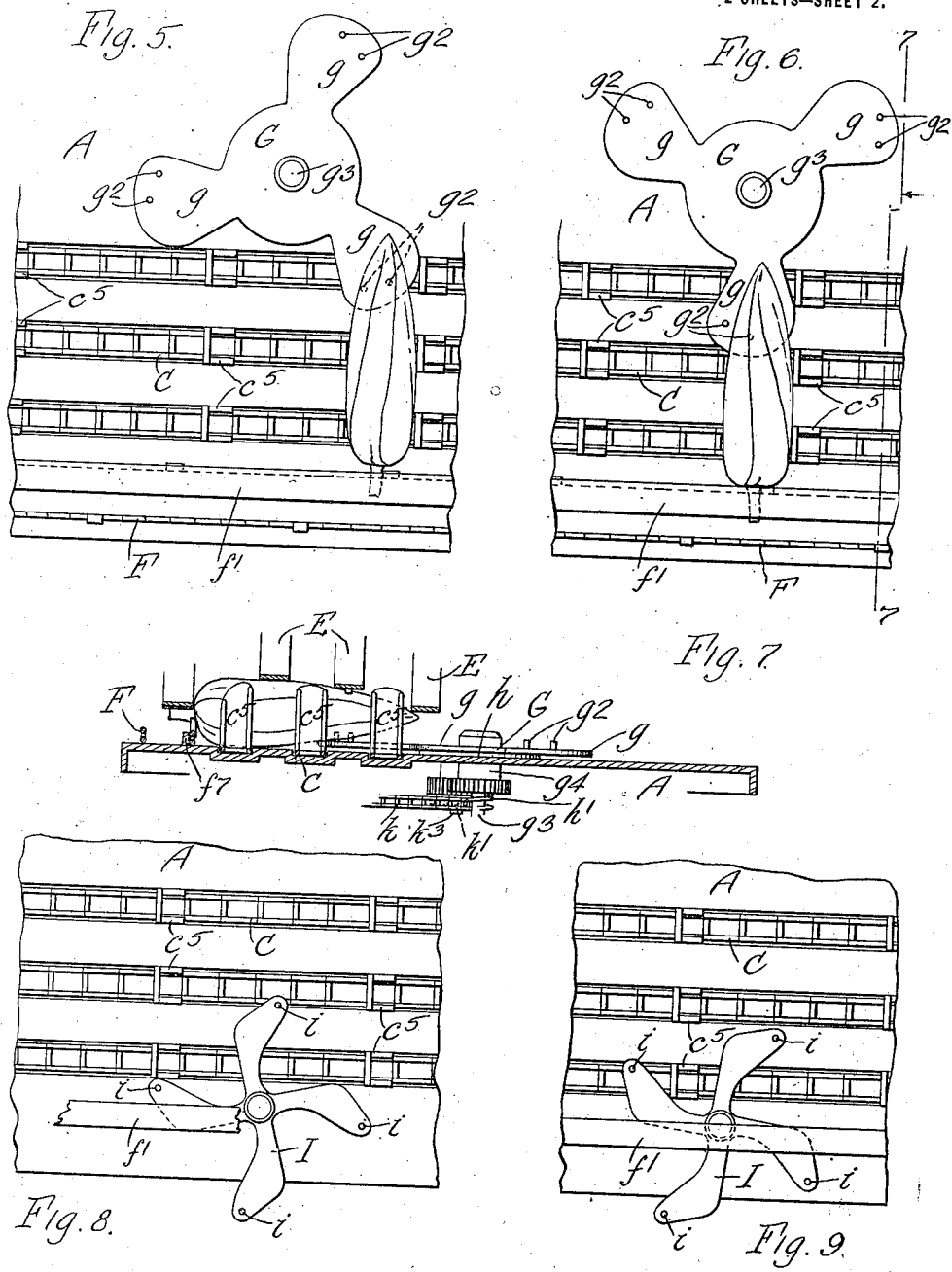

UNITED STATES PATENT OFFICE.

JOHN B. ZIMMERMAN, OF BUFFALO, NEW YORK, ASSIGNOR TO INVINCIBLE GRAIN CLEANER COMPANY, OF SILVER CREEK, NEW YORK.

CORN-HUSKING MACHINE.

1,195,164.  Specification of Letters Patent.  Patented Aug. 15, 1916.

Application filed June 12, 1915. Serial No. 33,723.

*To all whom it may concern:*

Be it known that I, JOHN B. ZIMMERMAN, a citizen of the United States, residing at Buffalo, in the county of Erie and State of New York, have invented a new and useful Improvement in Corn-Husking Machines, of which the following is a specification.

This invention relates to improvements in machines for husking green corn.

In corn husking machines of the type to which this invention relates the ears of corn are moved by a traveling feed conveyer past a butt cutter or knife which cuts off the butts or stalks and severs the husks at the butt end of the ear before the ears are delivered to the means which remove the husks therefrom. The ears of corn are placed by hand in position to be engaged and carried forward in a sidewise position by the conveyer to the butt cutter.

In order to obtain the best results the butts should be cut at such a point at the shoulder of the ear as to properly sever the husks without cutting into the kernels, which is wasteful and causes the corn to sour, and it is the object of this invention to provide efficient means of simple and inexpensive construction by which the ears of corn, if not placed by hand in proper relation to the butt cutter, are automatically shifted endwise transversely to the direction of travel of the feed conveyer into such relation, so as to insure of the butts being severed at the proper points.

In the accompanying drawings: Figure 1 is a plan view of the butt cutting mechanism and associated parts of a corn husking machine embodying the invention. Fig. 2 is a side elevation thereof. Fig. 3 is a longitudinal sectional elevation thereof, on line 3—3, Fig. 1, looking in the direction of the arrow. Fig. 4 is a transverse sectional elevation thereof on line 4—4, Fig. 1. Fig. 5 is a fragmentary plan view of the conveyer and ear positioning device, on an enlarged scale. Fig. 6 is a similar view, showing a different position of the parts. Fig. 7 is a transverse sectional elevation thereof on line 7—7, Fig. 6. Fig. 8 is a view similar to Fig. 5, showing a positioning device of modified construction. Fig. 9 is a similar view, showing a different position of the parts, A represents the feed table of a green corn husking machine, B a rotary butt cutter or knife for cutting the butts from the ears of corn, and C a conveyer for moving the ears of corn past the butt cutter. In the construction shown, the butt cutter B consists of a circular knife secured to a horizontal shaft $b$ extending crosswise over the feed table with the lower portion of the knife coöperating with an adjacent edge on the table to sever the stalks or butts. A chain $b'$ passing around a chain wheel $b^2$ on the cutter shaft is indicated by dotted lines in Fig. 1 for driving the cutter. The feed conveyer comprises a plurality of endless parallel conveyer chains which pass around chain wheels $c'$ on a shaft $c^2$ at one end of the table and around chain wheels $c^3$ on a shaft $c^4$ at the opposite end of the table. The chains have projecting lugs or fingers $c^5$ adapted to engage and shove the ears of corn to the butt cutter, and the upper runs of the chains travel in guide channels in the feed table A. A sprocket chain $d$ passing around a chain wheel $d'$ on one end of the conveyer shaft $c^4$ is shown for driving the conveyer. The ears of corn are placed by hand on the feed table or conveyer in rear of the conveyer teeth and are carried by the teeth in a sidewise position past the butt cutter B.

E represents bent spring strips which are secured at one end to a bridge or yoke $e$ extending crosswise over the feed table. These strips extend rearwardly beneath the bridge over the feed table and hold the ears of corn down upon the feed table against the conveyer teeth as they are moved forwardly by the conveyer. These presser springs are preferably provided at their free rear ends with depending teeth $e'$ adapted to engage the husks to tear or loosen them on the ears so that the husks will be more readily removed by the husking rolls or devices.

All of the parts above described are common in corn husking machines and may be of the construction shown and described or of any other suitable construction.

A gage or guide extends lengthwise along the feed table at the side of the conveyer adjacent to the butt cutter and against which the shoulders of the ears of corn are adapted to be placed for presenting the ears in proper position to the butt cutter B. This gage preferably consists of two bent spring strips $f$ $f'$ which are secured at one end at $f^2$ in any suitable manner to the bridge or yoke $e$ and extend rearwardly beneath the bridge above the feed table toward the butt cutter B, and a chain F which is arranged so that one portion thereof is located and adapted to move toward the butt cutter beneath the gage strips $f$ $f'$. The free rear end of the forward strip $f$ underlies the forward end of the other strip $f'$ and is preferably provided with a guide pin $f^3$, Fig. 2, which enters a hole in the overlying part of the rear gage strip, whereby the free end of the front gage strip is held in line with the rear gage strip, and a coil spring $f^4$ surrounding this guide pin between the two gage strips supplements the pressure due to the elasticity of the front gage strip.

The chain F passes around wheels $f^5$ $f^6$ which can be conveniently journaled by means of vertical shafts seated in bearing holes in the feed table. The chain is adapted to travel at the same speed as the feed conveyer and has upwardly projecting lugs suitably placed with reference to the lugs of the feed conveyer to engage the stalks of the ears so that the stalks are thus adapted to rest on and travel with the gage chain F, whereby the resistance to the movement of the ears is reduced and the ears are prevented from being swung out of their crosswise position on the conveyer. The gage chain could, if desired, be freely movable so as to be moved by the engagement of the ears therewith, but it is preferably positively driven by some suitable means, hereinafter described.

$f^7$ is a rib which holds the guiding run of the chain straight. The ears of corn are placed on the feed table in front of the gage and as they are carried rearwardly by the conveyer their stalk ends are adapted to pass under the gage strips. When the ears are placed with their shoulders against the inner edge of the gage they will be guided to the butt cutter so as to be cut at the proper points. The two gage strips are adapted to spring or yield upwardly independently of each other, so that when the butts of the ears of corn beneath the two strips are of different diameters the gage strip bearing on the thicker ear can yield upwardly to the extent necessary to accommodate such ear without lifting the other gage strip and thus interfering with its guiding action on a thinner ear.

G represents an ear placing device for engaging the ears of corn as they are moved along by the feed conveyer and shifting them endwise, or transversely relative to the direction of travel of the feed conveyer over against the gage. This placing device, in the construction shown in Figs. 1-7, consists of a wheel or plate mounted to rotate or swing horizontally over the feed table and preferably having a plurality of arms $g$ which are adapted to be engaged by the lugs of the conveyer for turning or swinging the device in a horizontal plane, and each of these arms is provided with one or more, preferably two, prongs or teeth $g^2$ which project upwardly a short distance from the upper face of the arms and are adapted to engage the husks of the ears of corn. The positioning wheel can be rotatably mounted in any suitable manner, as for instance, by a shaft $g^3$ which extends downwardly therefrom through a bearing $g^4$ on the feed table. A friction washer or disk $h$ preferably surrounds the shaft $g^3$ between the wheel and the upper surface of the feed table and the wheel is pressed down against this friction washer by a spring $h'$ surrounding the shaft $g^3$ below the table. The tension of the spring can be regulated by adjusting the nut $h^2$.

$h^3$ is a locking nut for the spring adjusting nut $h^2$.

The placing device G is journaled on the feed table at such a point that its arms are adapted to extend over the adjacent chain of the feed conveyer so as to be engaged by the lugs of this chain. As the chain travels along one of the lugs thereof engages one of the arms of the wheel G and turns the wheel a portion of a revolution, thereby bringing the next arm of the wheel into position to be engaged and moved by the next lug of the feed chain. The prongs of the placing device travel in circular paths which intersect the path of movement of the feed conveyer, and as the placing device is revolved, one of its arms is moved beneath the tassel end of each of the ears of corn being carried to the butt cutter by the conveyer, and the prong $g^2$ on the arms engaging the husks at the under side of the ear, will shift the ear endwise, or transversely of the conveyer, until it is arrested by the engagement of its shoulder with the gage, unless the shoulder of the ear was already against the gage. This shifting of the ears of corn over against the gage occurs when the ears are beneath the high front end portions of the presser springs, and as the ears are carried rearward beneath these springs the pressure of the springs on the ears of corn acts to prevent them from being moved away from the gage by the prongs of the placing device G, during that portion of the travel of the prongs when they move outwardly away from the conveyer. The tendency of the prongs to draw the ears of corn away from the gage is not great, however, since the tapering of the tassel ends of the ears permits the prongs to clear the ears without shifting them. As the prongs of the placing device penetrate the husks of the ears more or less, they tear the husks somewhat and thus coöperate with the prongs on the presser spring E in tearing or loosening the husks in addition to their function of shifting the ears over against the gage.

The drive means shown for the gage chain F consist of a sprocket chain $k$ passing around sprocket wheels $k'$ $k^2$, one on the shaft of the wheel $f^5$ for the gage chain and the other on a shaft $k^3$ geared to the shaft $g^3$ of the positioning device. This driving means is employed because it is exceedingly simple and inexpensive, but any other suitable driving means could be used.

Figs. 8 and 9 show a positioning wheel or device I which is similar in principle to the device before described, but which is disposed at the side of the feed conveyer C at which the gage is located and operates when revolved to pull the ears over against the gage instead of pushing them over, as in the case of the wheel G. This device is operated by the engagement of its arms with the lugs of the conveyer and has prongs $i$ for engaging the ears of corn, as in the case of the device G.

While the positioning device in both of the constructions shown is operated by engagement with the feed conveyer and this is preferred as it avoids the necessity for driving mechanism for the device, it will be understood that the positioning device could be revolved in proper time with the conveyer by driving means of any suitable kind.

I claim as my invention:

1. The combination of a butt cutter, a traveling conveyer for moving ears of corn to the butt cutter, a gage for the ears, and an ear placing device which is mounted to swing in a plane above and substantially parallel with the plane of movement of the conveyer and which has a part which engages the ears of corn and swings in a path intersecting the path of movement of the ears for moving the ears transversely of the conveyer over against the gage.

2. The combination of a butt cutter, a traveling conveyer for moving the ears of corn to the butt cutter, a gage for the ears, and an ear placing device which is mounted to move in a plane above and substantially parallel with the plane of movement of the conveyer and below the ears of corn and which has a part that engages the ears at their undersides and moves in a path intersecting the path of movement of the ears for moving the ears over against the gage.

3. The combination of a butt cutter, a traveling conveyer for moving ears of corn to said butt cutter, a gage for the ears, and an ear placing device which is mounted independently of the conveyer to move in a plane substantially parallel to the plane of movement of the conveyer and between the conveyer and the ears of corn to engage the ears of corn at their undersides and move them transversely of the line of travel of the conveyer over against the gage.

4. The combination of a butt cutter, a traveling conveyer having lugs for moving ears of corn to the butt cutter, a gage at one side of said conveyer, and an ear placing device past which the conveyer travels and which is mounted to swing in an arc intersecting the path of movement of the ears by the conveyer and into and out of a position between the lugs of the conveyer to move the ears of corn transversely of the line of travel of the conveyer over against the gage.

5. The combination of a butt cutter, a traveling conveyer having lugs for moving ears of corn to said butt cutter, a gage at one side of said conveyer, and a rotary positioning device having arms arranged to move in between the lugs of the conveyer beneath the ears of corn, said arms having upward projections adapted to engage the ears of corn and move them transversely of the conveyer against said gage.

6. The combination of a butt cutter, a traveling conveyer having lugs for moving ears of corn to said butt cutter, a gage at one side of said conveyer, and a rotary placing device journaled at one side of the conveyer and having arms arranged to pass in between and be engaged by the lugs of the conveyer for turning said device, said arms being adapted to engage and move the ears of corn transversely of the conveyer against said gage.

7. The combination of a butt cutter, a traveling conveyer for moving ears of corn to said butt cutter, a gage for the ears, and an ear placing device past which the conveyer travels and which is arranged to engage the ears and is actuated by said conveyer and moved thereby in a direction to move the ears transversely of their direction of movement by the conveyer over against said gage.

8. The combination of a butt cutter, a traveling conveyer for moving ears of corn to said butt cutter, a gage for the ears, and an ear placing device past which the conveyer travels and which is arranged to engage the ears and is directly actuated by said conveyer and is moved thereby in a plane substantially parallel with the plane of travel of the conveyer and in a direction to move the ears transversely of their direction of movement by the conveyer over against said gage.

9. The combination of a butt cutter, a traveling conveyer for moving ears of corn to said butt cutter, a gage for the ears, and an ear placing device past which the conveyer travels which is arranged to engage the ears and is moved by said conveyer in between the conveyer and the ears of corn and in a direction to move the ears transversely of their direction of movement by the conveyer over against said gage.

10. The combination of a butt cutter, a conveyer for moving ears of corn to the butt cutter, a gage for the ears, an ear placing device comprising a plate past which the conveyer moves and which is pivoted to swing in the plane of the plate in a path intersecting the direction of movement of the ears by the conveyer for engaging the ears of corn and moving them transversely of their direction of movement by the conveyer over against the gage.

11. The combination of a butt cutter, a conveyer for moving ears of corn to the butt cutter, a gage for the ears, and an ear placing device comprising a plate past which the conveyer moves and which is pivoted to swing in the plane of the plate in a path intersecting the direction of movement of the ears by the conveyer for engaging the ears of corn and moving them transversely of their direction of movement by the conveyer over against the gage, said placing device being actuated by the engagement of the conveyer therewith.

12. The combination of a butt cutter, a traveling conveyer for moving ears of corn to the butt cutter, a cutting gage at one side of the conveyer comprising a member which travels in substantially the same direction as the conveyer, and a plurality of alined independently movable presser strips extending lengthwise above said gage and each adapted to bear on the stalk of a different ear of corn for holding the same down on the gage.

13. The combination of a butt cutter, a traveling conveyer for moving ears of corn to the butt cutter, and a butt gage for the ears extending lengthwise at one side of the conveyer and comprising a traveling chain which is arranged with one portion thereof extending and adapted to travel substantially parallel with the feed conveyer in position to engage the butt ends of the ears beneath the stalks, said chain projecting upwardly a distance materially less than the diameter of the smallest ears of corn to form an abutment for the shoulders of the ears while permitting the stalks to project outwardly over the top of the chain.

14. The combination of a butt cutter, a traveling conveyer for moving ears of corn to the butt cutter, and a gage for the ears comprising a chain which is arranged with one portion thereof extending and adapted to travel lengthwise beside and in the same direction as the conveyer, a strip extending lengthwise above the gage and adapted to engage the butts of the ears, and means for driving said chain.

15. The combination of a butt cutter, a traveling conveyer for moving ears of corn to the butt cutter, and a gage for the ears comprising a chain which is arranged with one portion thereof extending and adapted to travel lengthwise beside and in the same direction as the conveyer in position to engage the shoulders of the ears and permit the stalks to extend outwardly over the chain, and an ear positioning device arranged to engage the ears of corn and move them crosswise of the conveyer against said gage.

Witness my hand this 10th day of June 1915.

JOHN B. ZIMMERMAN.

Witnesses:
LOREN B. CHAPIN,
LEON H. BRAND.